United States Patent
Gilmore

(10) Patent No.: US 9,347,503 B2
(45) Date of Patent: May 24, 2016

(54) ACTUATOR FOR A DRIVELINE COMPONENT

(71) Applicant: AMERICAN AXLE & MANUFACTURING, INC., Detroit, MI (US)

(72) Inventor: Curt D. Gilmore, Fenton, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 0 days.

(21) Appl. No.: 14/772,285

(22) PCT Filed: Feb. 17, 2015

(86) PCT No.: PCT/US2015/016111
§ 371 (c)(1),
(2) Date: Sep. 2, 2015

(87) PCT Pub. No.: WO2015/126809
PCT Pub. Date: Aug. 27, 2015

(65) Prior Publication Data
US 2016/0017932 A1    Jan. 21, 2016

Related U.S. Application Data

(60) Provisional application No. 61/942,364, filed on Feb. 20, 2014.

(51) Int. Cl.
*F16D 37/02* (2006.01)
*F16D 27/09* (2006.01)
*F16D 11/14* (2006.01)
*F16D 23/02* (2006.01)

(52) U.S. Cl.
CPC ............... *F16D 27/09* (2013.01); *F16D 11/14* (2013.01); *F16D 23/025* (2013.01)

(58) Field of Classification Search
CPC ........ F16D 27/09; F16D 23/025; F16D 11/14
See application file for complete search history.

(56) References Cited

U.S. PATENT DOCUMENTS 2,973,851 A * 3/1961 Rudisch .................. F16D 27/09
192/110 B
3,400,797 A * 9/1968 Horn ....................... F16D 27/09
188/161

(Continued)

FOREIGN PATENT DOCUMENTS

EP     1510715 A1   3/2005
RU    2394747 C1   7/2010

OTHER PUBLICATIONS

International Search Report and Written Opinion for PCT/US2015/016111, mailed Jun. 4, 2015; ISA/RU.

*Primary Examiner* — David J Hlavka
(74) *Attorney, Agent, or Firm* — Harness, Dickey & Pierce, P.L.C.

(57) ABSTRACT

An actuator with an indexing guide, first and second indexing rings, an actuator output, a spring and a motor. The indexing guide has a first cam. The first indexing ring is slidably mounted to the indexing guide and includes a second cam. The second indexing ring is slidably and rotatably disposed on the indexing guide and has spline teeth, which engage the first cam, and a third cam that engages the second cam. The spring exerts a force onto the second indexing ring that drives the second indexing ring toward the first indexing ring. The motor is configured to reciprocate the first indexing ring so that cooperation between the second and third cams and between the spline teeth and the first cam causes axial and rotational movement of the second indexing ring about an actuation axis.

20 Claims, 6 Drawing Sheets

(56) References Cited

U.S. PATENT DOCUMENTS

| | | |
|---|---|---|
| 5,651,437 A | 7/1997 | Organek et al. |
| 5,739,605 A | 4/1998 | Lazorchak |
| 6,428,019 B1 | 8/2002 | Kincad et al. |
| 7,086,515 B2 | 8/2006 | Kelley, Jr. et al. |
| 7,121,393 B1 * | 10/2006 | Skipper ................ F16D 23/025 192/48.91 |
| 7,717,437 B2 | 5/2010 | Adams, III et al. |
| 7,775,928 B2 | 8/2010 | Zink |
| 7,832,739 B2 | 11/2010 | Pinkos et al. |
| 8,047,323 B2 | 11/2011 | Downs et al. |
| 2005/0071979 A1 * | 4/2005 | Guthrie ................ F16D 23/025 29/458 |
| 2008/0011535 A1 * | 1/2008 | Bramstedt ............... F16D 11/14 180/219 |
| 2011/0101631 A1 | 5/2011 | Pinkos et al. |
| 2013/0333998 A1 * | 12/2013 | Skipper ................ F16D 23/025 192/53.34 |

\* cited by examiner

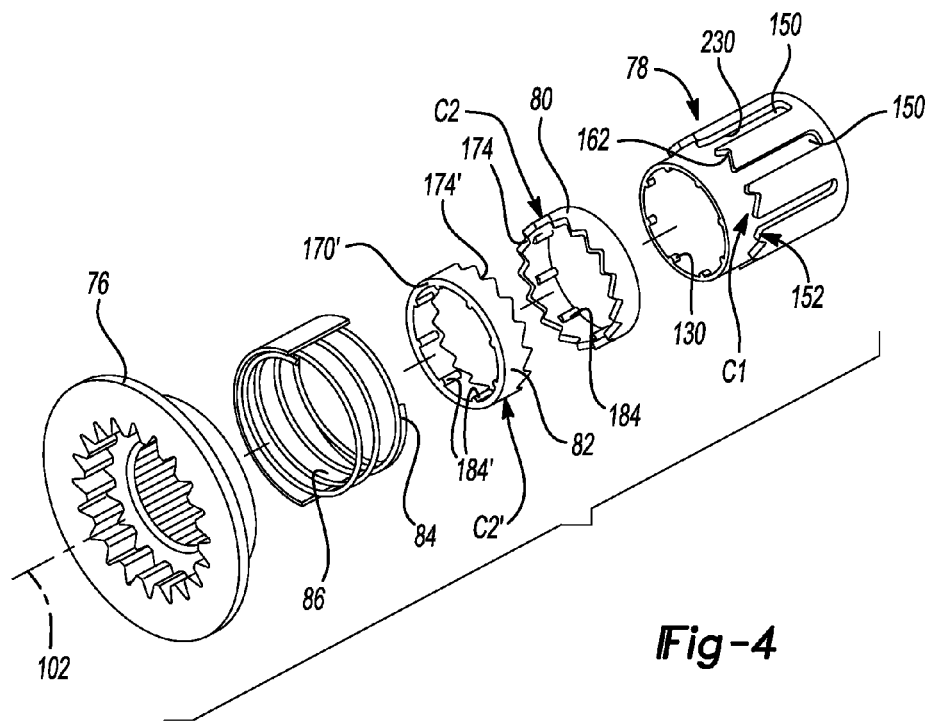
Fig-4
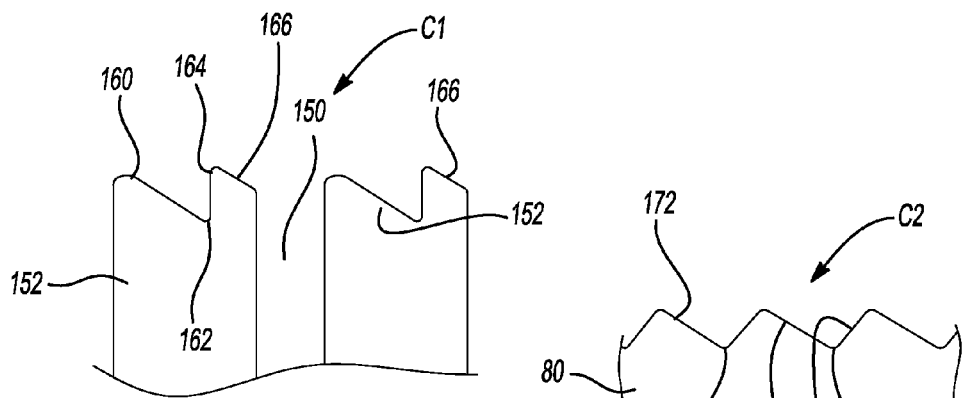
Fig-5
Fig-6

ACTUATOR FOR A DRIVELINE COMPONENT

CROSS-REFERENCE TO RELATED APPLICATIONS

This application claims the benefit of U.S. Provisional Application No. 61/942,364, filed on Feb. 20, 2014. The entire disclosure of the above application is incorporated herein by reference.

FIELD

The present disclosure relates to an actuator that can be employed to move a shiftable member in a driveline component.

BACKGROUND

This section provides background information related to the present disclosure which is not necessarily prior art.

Linear actuators are employed in a number of driveline components, such as axles, transfer cases, power take-off units and center differentials, to selectively engage and disengage one or more power transmitting elements. The selective engagement between the various power transmitting elements could be employed, for example, to inhibit relative rotation of at least one of the power transmitting element relative to another element of the driveline component and/or to cause the driveline component to operate in a different speed or mode.

Such linear actuators typically include a motor, the output of which is employed to cause movement of the one or more power transmitting elements. Examples of commonly employed motors include fluid-powered motors, such as pneumatic motors and hydraulic motors, solenoids, such as solenoids having an electromagnetically inductive coil and an armature that is movable relative to the coil, and induction motors.

While the known linear actuators are suitable for their intended purpose, I have identified a need in the art for a linear actuator that is suited for use in a vehicle driveline component and which can be maintained in a particular state (i.e., engaged or disengaged) without requiring the application of continuous power to the motor of the linear actuator.

SUMMARY

This section provides a general summary of the disclosure, and is not a comprehensive disclosure of its full scope or all of its features.

In one form, the present teachings provide an actuator that includes an annular indexing guide, first and second indexing rings, an actuator output, a first spring and a motor. The annular indexing guide is disposed along an actuation axis and defines a first cam having a plurality of first cam teeth and a plurality of guide grooves. The first cam teeth are spaced circumferentially about the indexing guide. The guide grooves are spaced circumferentially about the indexing guide such that each of the guide grooves is disposed between a pair of the first cam teeth. The first indexing ring is slidably received on the indexing guide for reciprocating motion along the actuation axis. The first indexing ring defines a plurality of first spline teeth, a first abutment surface and a second cam. The first spline teeth are disposed on an internal surface of the first indexing ring and are received in the guide grooves. The second cam is spaced apart from the first abutment surface along the actuation axis and has a plurality of second cam teeth. The second indexing ring is slidably received on the indexing guide for reciprocating motion along the actuation axis. The second indexing ring defines a plurality of second spline teeth and a third cam. The second spline teeth are disposed on an interior surface of the second indexing ring and engage the first cam. The third cam is engaged to the second cam. The first spring is disposed on a side of the actuator output opposite the second indexing ring and biases the actuator output toward the second indexing ring. The motor has a motor output member that is configured to move the first indexing ring along the actuation axis from a first position to a second position. The second spline teeth are not engaged to the first cam teeth when the first indexing ring is in the first position. The second spline teeth are disposed on the first cam teeth when the first indexing ring is in the second position.

In another form, the present teachings provide an actuator that includes an annular indexing guide, first and second indexing rings, an actuator output, first and second springs and a motor. The annular indexing guide is disposed along an actuation axis and defines a first cam having a plurality of first cam teeth and a plurality of guide grooves. The first cam teeth are spaced circumferentially about the indexing guide. The guide grooves are spaced circumferentially about the indexing guide such that each of the guide grooves is disposed between a pair of the first cam teeth. The first indexing ring is slidably received on the indexing guide for reciprocating motion along the actuation axis. The first indexing ring defines a plurality of first spline teeth, a first abutment surface and a second cam. The first spline teeth are disposed on an internal surface of the first indexing ring and are received in the guide grooves. The second cam is spaced apart from the first abutment surface along the actuation axis and has a plurality of second cam teeth. The second indexing ring is rotatably and slidably received on the indexing guide. The second indexing ring defines a plurality of second spline teeth and a third cam. The second spline teeth are disposed on an interior surface of the second indexing ring and engage the first cam. The third cam is engaged to the second cam. The first spring is disposed between the actuator output and the second indexing ring and biases the second indexing ring away from the actuator output and toward the first indexing ring. The second spring is disposed on a side of the actuator output opposite the first spring and biases the actuator output toward the second indexing ring. The motor has a motor output member that is configured to move the first indexing ring along the actuation axis from a first position to a second position. Engagement of the second and third cam teeth as the first indexing ring is repeatedly reciprocated between the first and second positions causes rotation of the second indexing ring about the actuator axis such that the second spline teeth can be alternately aligned to the first cam teeth and the guide grooves.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is an enlarged portion of FIG. 2, illustrating an indexing guide and first and second indexing rings in more detail;

FIG. 5 is a side view of a portion of the indexing guide;

FIG. 6 is a side view of a portion of the first indexing ring;

Corresponding reference numerals indicate corresponding parts throughout the several views of the drawings.

DETAILED DESCRIPTION

Example embodiments will now be described more fully with reference to the accompanying drawings.

Figure 1:
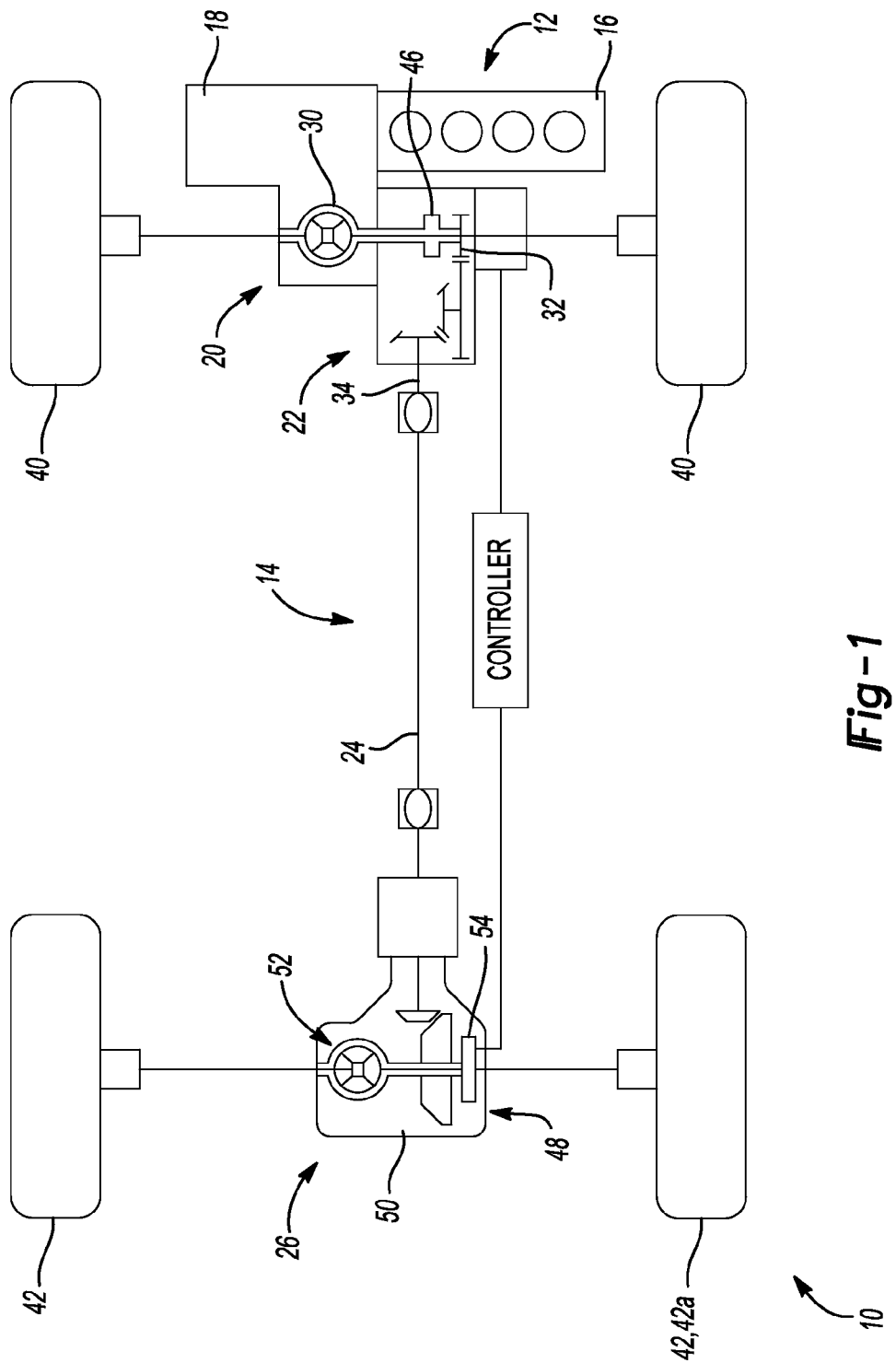
FIG. 1 is a schematic illustration of a vehicle having an exemplary driveline component that includes a linear actuator (actuator assembly) constructed in accordance with the teachings of the present disclosure.

With reference to FIG. 1 of the drawings, an exemplary vehicle having a driveline component with a linear actuator constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations. The drive train 14 can include a front axle assembly 20, a power take-off unit (PTU) 22, a prop shaft 24 and a rear axle assembly 26. The front axle assembly 20 can be configured in any desired manner, such as a front beam axle or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The rear axle assembly 26 can be configured in any desired manner, such as a rear beam axle, an independent rear drive axle, or a rear drive module. The front axle assembly 20 can be driven on a full-time basis to drive front vehicle wheels 40, while one or more clutches could be employed to selectively interrupt power transmission to the rear axle assembly 26 and the rear vehicle wheels 42. In the particular example provided, the drive train 14 includes a first clutch 46, which can be configured to interrupt the transmission of rotary power through the PTU 22 (e.g., decouple the input member 30 of the front axle assembly 20 from the PTU input member 32), and a second clutch 48, which can be configured to interrupt power transmission between a side gear 50 of a differential assembly 52 and an associated one of the rear vehicle wheels 42a. The second clutch 48 can include an actuator assembly 54 that is constructed in accordance with the teachings of the present disclosure.

Figure 2:
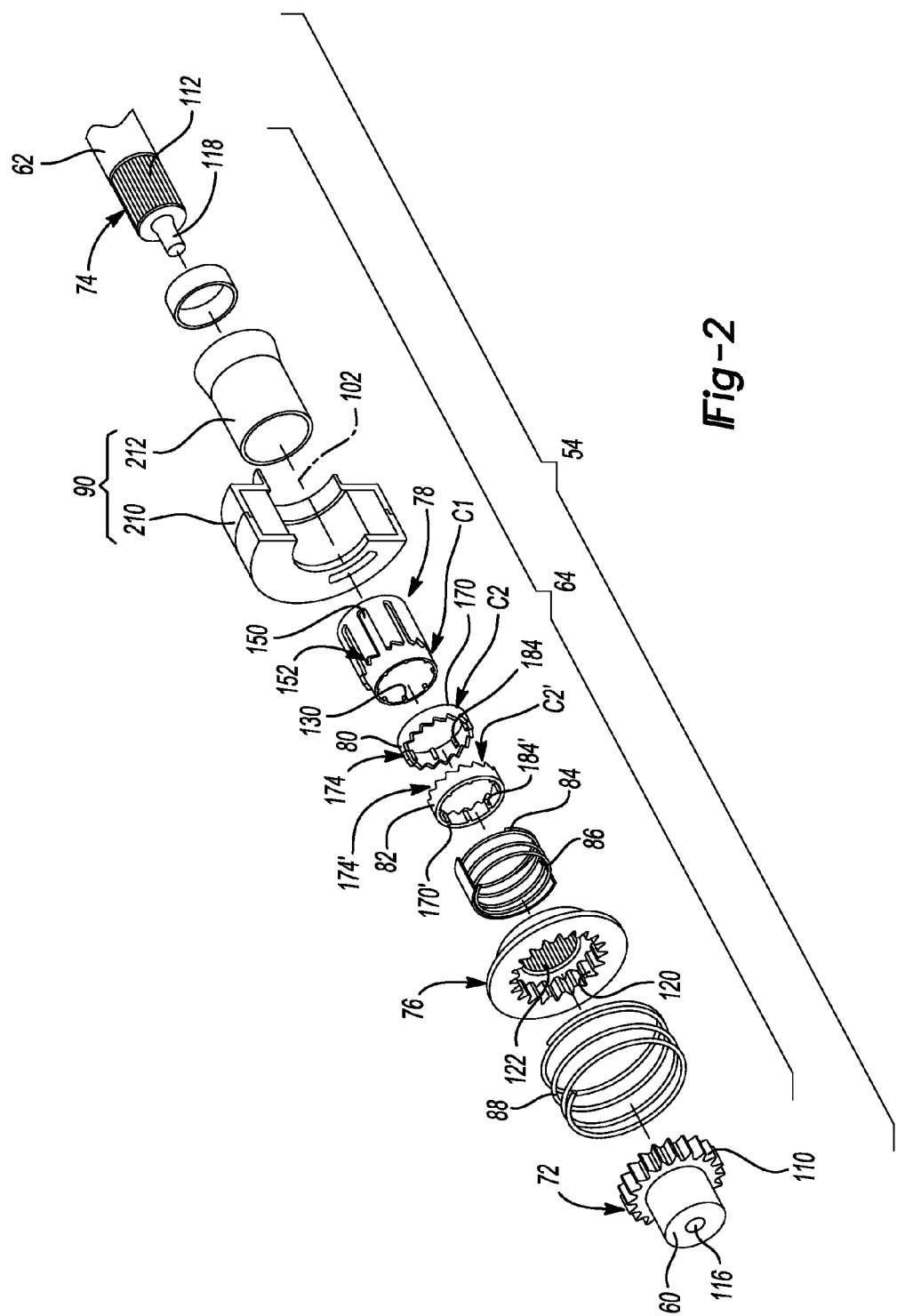
FIG. 2 is an exploded perspective view of a portion of the actuator assembly of FIG. 1.
Figure 3:
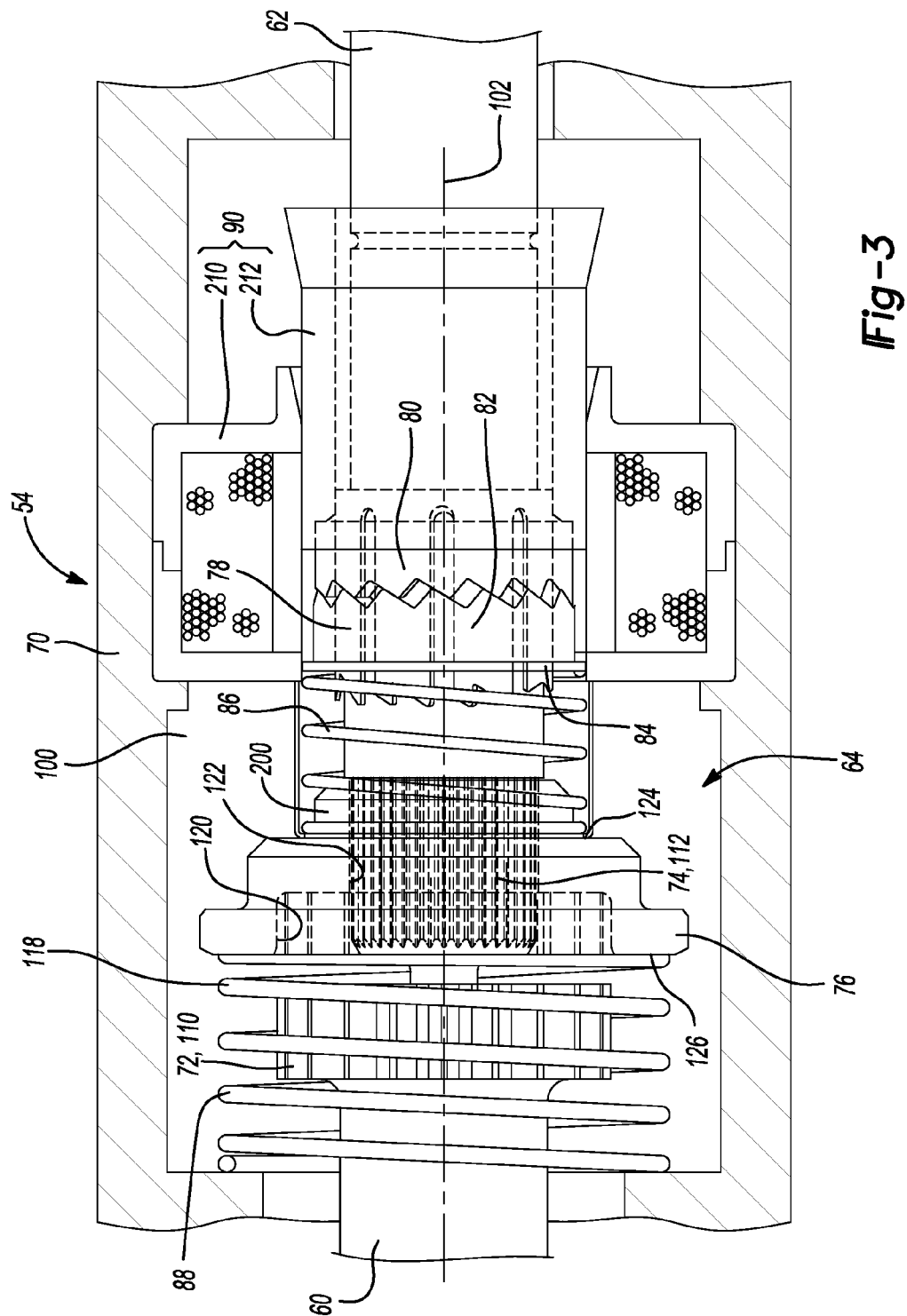
FIG. 3 is a longitudinal cross-section view of the actuator assembly of FIG. 1, illustrating the actuator of the actuator assembly in a disengaged state.

With reference to FIGS. 2 and 3, the actuator assembly 54 can include a first shaft 60, a second shaft 62 and an actuator 64 having an actuator housing 70, a first actuator member 72, a second actuator member 74, a shift member 76, an indexing guide 78, first and second indexing rings 80 and 82, respectively, a thrust member 84, a first biasing spring 86, a second biasing spring 88 and a motor 90. The first shaft 60 can have a first end, which can be coupled to one of the side gears 50 for rotation therewith, and a second, opposite end that can be fixedly and non-rotatably coupled to the first actuator member 72. The second shaft 62 can have a first end, which can be coupled to one of the rear wheels 42a (FIG. 1) for rotation therewith, and a second, opposite end that can be fixedly and non-rotatably coupled to the second actuator member 74.

The actuator housing 70 can define a cavity 100 into which the second ends of the first and second shafts 60 and 62 and all or part of the remainder of the actuator 64 can be received. The first and second shafts 60 and 62 can be rotatable relative to the actuator housing 70 and can be disposed such that their longitudinal axes are coincident with an axis 102 that can be defined by the actuator housing 70.

The first actuator member 72 can be fixedly and non-rotatably coupled to the first shaft 60 and can comprise a plurality of circumferentially spaced apart first teeth 110. Similarly, the second actuator member 74 can be fixedly and non-rotatably coupled to the second shaft 62 and can comprise a plurality of circumferentially spaced apart second teeth 112. If desired, a set of piloting features can be employed to maintain the second ends of the first and second shafts 60 and 62 and the first and second actuator members 72 and 74 in a position such that their rotational axes are coincident. In the particular example provided, the set of piloting features includes a hole 116, which formed into the first actuator member 72 and the second end of the first shaft 60 concentric with the longitudinal axis of the first shaft 60, and a shank 118 that extends from the second actuator member 74 on a side that is opposite the second end of the second shaft 62 (i.e., such that the second actuator member 74 is disposed between the shank 118 and the second end of the second shaft 62). The shank 118 is disposed concentrically about the longitudinal axis of the second shaft 62 and is received into the hole 116. The shank 118 and the hole 116 are sized to align the longitudinal axes of the first and second shafts 60 and 62 to one another (and thereby coincident with the axis 102).

The shift member 76, which can be the output (member) of the actuator 64, can be movable within the cavity 100 along the axis 102 and can have a plurality of third teeth 120, a plurality of fourth teeth 122, a first spring flange 124 and a second spring flange 126. The third teeth 120 can be configured to axially and meshingly engage the first teeth 110, while the fourth teeth 122 can be configured to axially and meshingly engage the second teeth 112. The first and second spring flanges 124 and 126 can be disposed on the shift member 76 in any desired location. In the example provided, the first spring flange 124 is formed on a first axial side of the shift member and radially between the third teeth 120 and the second teeth 112, while the second spring flange 126 is formed on a second, opposite axial side of the shift member 76 radially outwardly of the third teeth 120. Those of skill in the art will appreciate that the first spring flange 124 and/or the second spring flange 126 could be located differently. For example, the first spring flange 124 could be located on the first axial side of the shift member 76 radially outward of the third teeth 120. Alternatively, the second spring flange 126 could be disposed radially between the third and fourth teeth 120 and 122. Moreover, the first teeth 110 and/or the second teeth 112 could be sized differently from that which is depicted in the particular example provided, which could provide other opportunities for the placement of the first spring flange 124 and/or the second spring flange 126.

The indexing guide 78 can be an annular structure that can be disposed about the axis 102 and non-rotatably coupled to the second actuator member 74. In the particular example provided, the indexing guide 78 defines a plurality of fifth teeth 130 on its inside surface that engage the second teeth 112 to inhibit relative rotation between the indexing guide 78 and the second actuator member 74 while permitting the indexing guide 78 to be slidably mounted on the second actuator member 74. With reference to FIG. 4, the indexing guide 78 can define a first cam Cl that can have a plurality of guide grooves 150, which can be spaced circumferentially apart about the exterior surface of the indexing guide 78, and a plurality of first cam teeth 152. With additional reference to FIG. 5, each of the first cam teeth 152 can be formed on an axial end of the indexing guide 78 and can be disposed between an adjacent pair of the guide grooves 150. Each of the first cam teeth 152 and can include a first ramp 160, a first valley 162, an abutment wall 164 and a second ramp 166. The first ramp 160 can extend (taper) from a first one of the guide slots 150 in a direction that is radially toward the adjacent one of the guide slots 150 and axially toward the second, opposite axial end of the indexing guide 78. The abutment wall 164 can extend generally parallel to the axis 102 and can cooperate with the first ramp 160 to define the first valley 162 (i.e., where the first ramp 160 intersects the abutment wall 164). The second ramp 166 can extend from the abutment wall 164 to the adjacent one of the guide slots 150 and can extend (taper) from the abutment wall 164 toward the adjacent of the guide slots 150 in a direction that is radially toward the adjacent one of the guide slots 150 and axially toward the second, opposite axial end of the indexing guide 78. Accordingly, each of the first cam teeth 152 can be shaped in a manner that is similar to two generally V-shaped saw teeth of an annular hole saw.

Returning to FIG. 4, the first and second indexing rings 80 and 82 can be identical in their construction and as such, a detailed discussion of the first indexing ring 80 will suffice for both. To avoid confusion, reference numerals associated with components or features of the second indexing ring 82 will be identified with a prime symbol but will otherwise use the same reference numeral as employed for that component or feature of the first indexing ring 80. With additional reference to FIG. 6, the first indexing ring 80 can be an annular structure having a first axial end 170 and a second axial end 172 onto which a second cam C2 having a plurality of second cam teeth 174 can be formed. Each of the second cam teeth 174 is generally V-shaped, having a third ramp 176, a fourth ramp 178 and a second valley 180 between the third and fourth ramps 176 and 178. A plurality of spline teeth 184 can be formed on the inside surface of the first indexing ring 80.

With reference to FIGS. 3 and 4, the first indexing ring 80 can be slidably received on the indexing guide 78 such that the spline teeth 184 are received into the guide slots 150 and the second cam teeth 174 face away from the second axial end of the indexing guide 78. The first indexing ring 80 is configured to translate on the indexing guide 78, but not to rotate relative to the indexing guide 78. The second indexing ring 82 can be received about the second actuator member 74 such that the second cam teeth 174' on the second indexing ring 82 face the second cam teeth 174 on the first indexing ring 80. As will be discussed in more detail below, the spline teeth 184' of the second indexing ring 82 are configured to be received in the first valleys 162 in the first cam 152 when the actuator 64 is in the engaged state and to be received into the guide slots 150 when the actuator 64 is in the disengaged state, while engagement of the second cam teeth 174 on the first indexing ring 80 to the second cam teeth 174' on the second indexing ring 82 is configured to initiate rotary motion of the second indexing ring 82 relative to the indexing guide 78 and the first indexing ring 80.

The first biasing spring 86 can be mounted coaxially about the second actuator member 74 and can be disposed between the shift member 76 and the second indexing ring 82 to bias the second indexing ring 82 apart from the shift member 76 along the axis 102. The first biasing spring 86 can abut the first spring flange 124. If desired, the shift member 76 can define a hub 200 (FIG. 3) onto which the first biasing spring 86 is piloted. The thrust member 84, which can be a washer or a thrust bearing, can be disposed between the first biasing spring 86 and the second indexing ring 82. The thrust member 84 can abut the first axial end 170' of the second indexing ring 82.

The second biasing spring 88 can be disposed coaxially about the first actuator member 72 and can be configured to bias the shift member 76 toward a position where the third teeth 120 on the shift member 76 are disengaged from the first teeth 110 on the first actuator member 72. Stated another way, the second biasing spring 88 can be configured to bias the shift member 76 into a position that is associated with operation of the actuator 64 in the disengaged state. The second biasing spring 88 can be abutted against the second spring flange 126.

With reference to FIGS. 2 and 3, the motor 90 can be configured to selectively move the first indexing ring 80 along the axis 102 toward the first actuator member 72 to cause the actuator 64 to be alternately operated in the engaged and disengaged states. The motor 90 can be any type of device that can be configured to move the first indexing ring 80 in an axial direction. In the particular example provided, the motor 90 comprises a solenoid having an electromagnetically inductive coil 210 and an armature 212. The coil 210 can be an annular structure that can be fixedly and non-rotatably mounted to the actuator housing 70. The coil 210 can be received about the second shaft 62 and/or the second actuator member 74. The armature 212 can be received about the second shaft 62 and/or the second actuator member 74 and within the coil 210. The armature 212 can abut the first axial end 170 of the first indexing ring 80.

Figure 7:
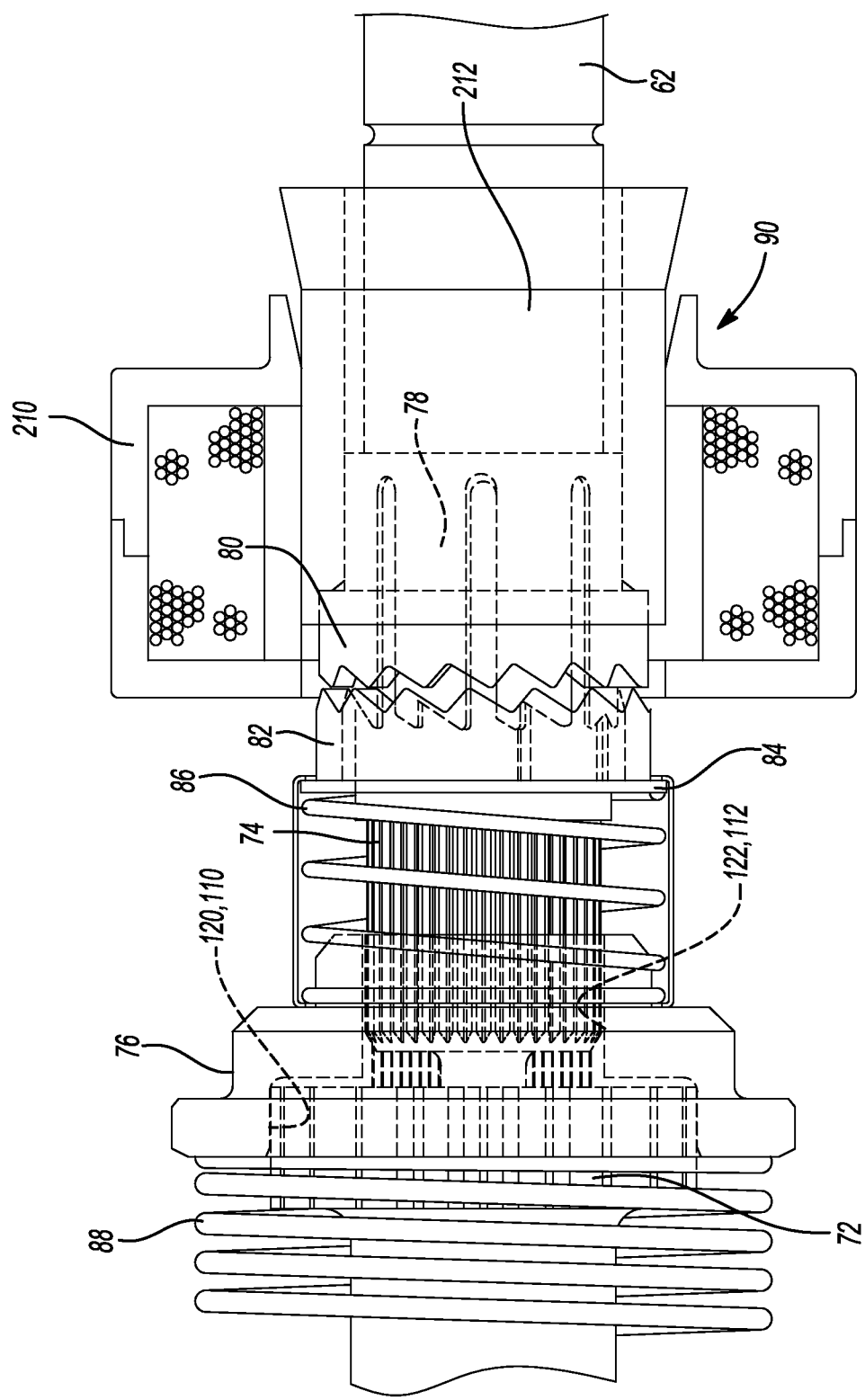
FIG. 7 is a view similar to that of FIG. 3 but illustrating the actuator in an engaged state.

In the disengaged state (shown in FIG. 3), the first and second biasing springs 86 and 88 urge the second indexing ring 82 toward the indexing guide 78 and the spline teeth 184' on the second indexing ring 82 are received in the guide grooves 150 in the indexing guide 78. The motor 90 can be operated to change the state of the actuator 64 from the disengaged state to the engaged state, for example, the motor 90 by driving the armature 212 along the axis 102 in a direction towards the first actuator member 72. The first indexing ring 80 can be moved along the axis 102 by the armature 212 to cause the third ramps 176 (FIG. 6) of the second cam teeth 174 to contact one another and to drive the spline teeth 184' on the second indexing ring 82 out of the first valleys 162 (FIG. 5). The third ramps 176 (FIG. 6) are configured to generate forces that would cause the second indexing ring 82 to rotate in a predetermined rotational direction as the first and second indexing rings 80 and 82 are moved together axially in the direction toward the first actuator member 72; abutment of the spline teeth 184' against sidewalls 230 (FIG. 4) of the guide slots 150 inhibits rotation of the second indexing ring 82 relative to the first indexing ring 80. When the second indexing ring 82 has been moved in the axial direction toward the first actuator member 72 to a point where the spline teeth 184' of the second indexing ring 82 have disengaged the sidewalls 230 (FIG. 4) of the guide slots 150, the rotary force generated by contact between the third ramps 176 (FIG. 6) on the first and second indexing rings 80 and 82 causes rotation of the second indexing ring 82 relative to the indexing guide 78 that orients the spline teeth 184' of the second indexing ring 82 to the first ramps 160 (FIG. 5) on the first cam teeth 152. Due to the sloped configuration of the first ramps 160 (FIG. 5) and the axially directed force applied to the second indexing ring 82 by the first and second biasing springs 86 and 88, the second indexing ring 82 can rotate somewhat in the predetermined rotational direction, which can cause the third ramps 176 (FIG. 6) to ride over one another and orient the fourth ramps 178 (FIG. 6) to one another. Depending on the geometry of the various ramped surfaces, rotation of the second indexing ring 82 relative to the indexing guide 78 may be sufficient to align the spline teeth 184' of the second indexing ring 82 to the first valleys 162 (FIG. 5) in the indexing guide 78. The motor 90 can be operated to drive the armature 212 (or to permit the armature 212 to be driven, e.g., via the first biasing spring 86) in an axial direction away from the first actuator member 72 so that the spline teeth 184' of the second indexing ring 82 are well received into the first valleys 162 (FIG. 5) and abutted against the first axial end of the indexing guide 78. It will be appreciated that if the spline teeth 184' of the second indexing ring 82 were not aligned to the first valleys 162 (FIG. 5) at the end of the stroke of the armature 212, the spline teeth 184' of the second indexing ring 82 will ride along the first ramps 160 (FIG. 5) when the armature 212 is retracted away from the first actuator member 72, causing the second indexing ring 82 to rotate slightly in the predetermined direction so that the spline teeth 184' of the second indexing ring 82 can be received into the first valleys 162 (FIG. 5). In this condition, the actuator 64 is in the engaged state (shown in FIG. 7) and power (e.g., electrical power) need not be provided to the motor 90 to maintain the actuator 64 in the engaged state.

To operate the actuator 64 in the disengaged state, the motor 90 is operated to move the armature 212 toward the first actuator member 72. The first indexing ring 80 can be moved along the axis 102 by the armature 212 to cause the third ramps 176 (FIG. 6) of the second cam teeth 174 to contact one another and to drive the spline teeth 184' on the second indexing ring 82 out of the first valleys 162 (FIG. 5). As noted above, the third ramps 176 (FIG. 6) are configured to generate forces that would cause the second indexing ring 82 to rotate in the predetermined rotational direction as the first and second indexing rings 80 and 82 are moved together axially in the direction toward the first actuator member 72; abutment of the spline teeth 184' against the abutment walls 164 (FIG. 5) of the first cam teeth 152 inhibits rotation of the second indexing ring 82 relative to the indexing guide 78. When the second indexing ring 82 has been moved in the axial direction toward the first actuator member 72 to a point where the spline teeth 184' of the second indexing ring 82 have disengaged the abutment walls 164 (FIG. 5) of the indexing guide 78, the rotary force generated by contact between the third ramps 176 (FIG. 6) on the first and second indexing rings 80 and 82 causes rotation of the second indexing ring 82 relative to the indexing guide 78 that orients the spline teeth 184' of the second indexing ring 82 to the second ramps 166 (FIG. 5) on the first cam teeth 152. Due to the sloped configuration of the second ramps 166 (FIG. 5) and the axially directed force applied to the second indexing ring 82 by the first and second biasing springs 86 and 88, the second indexing ring 82 can rotate somewhat in the predetermined rotational direction, which can cause the third ramps 176 (FIG. 6) to ride over one another and orient the fourth ramps 178 (FIG. 6) to one another. Depending on the geometry of the various ramped surfaces, rotation of the second indexing ring 82 relative to the indexing guide 78 may be sufficient to align the spline teeth 184' of the second indexing ring 82 to the guide slots 150 in the indexing guide 78. The motor 90 can be operated to drive the armature 212 (or to permit the armature 212 to be driven, e.g., via the first biasing spring 86) in an axial direction away from the first actuator member 72 so that the spline teeth 184' of the second indexing ring 82 are well received into the guide slots 150 in the indexing guide 78. It will be appreciated that if the spline teeth 184' of the second indexing ring 82 were not aligned to the guide slots 150 at the end of the stroke of the armature 212, the spline teeth 184' of the second indexing ring 82 will ride along the second ramps 166 (FIG. 5) when the armature 212 is retracted away from the first actuator member 72, causing the second indexing ring 82 to rotate slightly in the predetermined direction so that the spline teeth 184' of the second indexing ring 82 can be received into the guide slots 150. In this condition, the actuator 64 is in a disengaged state and power (e.g., electrical power) need not be provided to the motor 90 to maintain the actuator 64 in the disengaged state.

It will be appreciated that the first biasing spring 86 can permit full movement of the armature 212 when the shift member 76 is misaligned (rotationally) to the first actuator member 72 such that the third teeth 120 cannot engage the first teeth 110. Similarly, it will be appreciated that the second biasing spring 88 can be employed to bias the shift member 76 out of engagement with the first actuator member 72.

It will be appreciated that the above-described actuator has application to other devices in which a co-axial arrangement is desired. For example, the above-described actuator could be substituted for another type of co-axial actuator, such as the clutch assembly (62) that is depicted in U.S. Pat. No. 7,832,739, or a non-coaxial actuator, such as the actuator (70) that is depicted in U.S. Pat. No. 8,047,323 or the actuator (332) that is depicted in U.S. Pat. No. 7,775,928. Each of the above-referenced patents is incorporated by reference as if fully set forth in detail herein.

While the motor 90 has been described as comprising a solenoid with a coil and an armature, those of skill in the art will appreciate that various other types of motors, including fluid powered motors (e.g., pneumatic and hydraulic motors), could be employed in the alternative.

Figure 8:
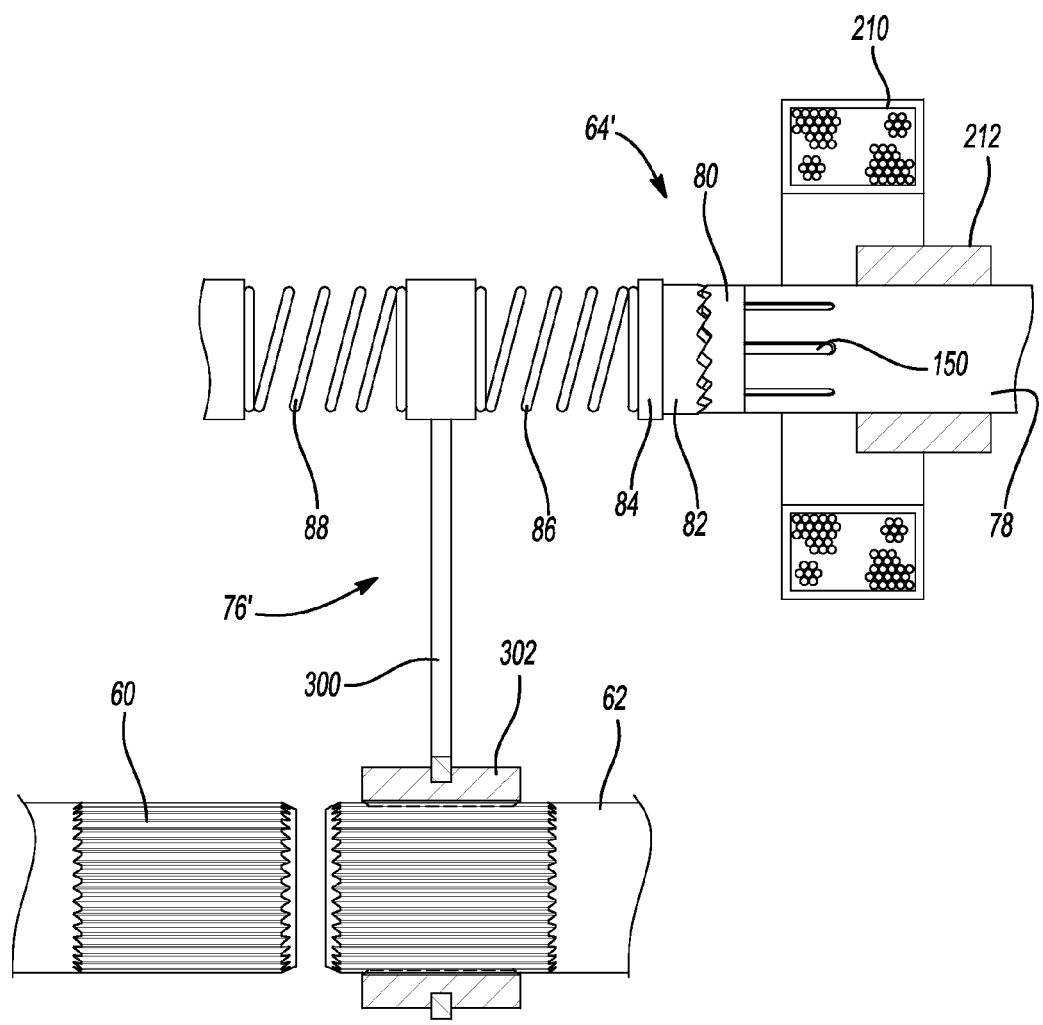
FIG. 8 is a schematic illustration of another actuator assembly constructed in accordance with the teachings of the present disclosure.

Moreover, while the actuator 64 has been described as being coaxial with the first and second shafts 60 and 62, it will be understood that the actuator 64 could be offset from the rotational axes of the first and second shafts 60 and 62 and as is shown in FIG. 8. In this example, the shift member 76' comprises a shift fork 300 and a toothed collar 302 that is coupled to the shift fork 300 for movement therewith. Accordingly, the actuator 64' of FIG. 8 could be substituted for the actuator (332) that is depicted in U.S. Pat. No. 7,775,928, the actuator (70) that is depicted in U.S. Pat. No. 8,047,323, or the clutch assembly (42) that is depicted in U.S. Pat. No. 6,428,019, the disclosures of which are incorporated by reference as if fully set forth in detail herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuator (64) comprising:
an annular indexing guide (78) that is disposed along an actuation axis (102), the indexing guide (78) defining a first cam (C1) having a plurality of first cam teeth (152) and a plurality of guide grooves (150), the first cam teeth (152) being spaced circumferentially about the indexing guide (78), the guide grooves (150) being spaced circumferentially about the indexing guide (78) such that each of the guide grooves (150) is disposed between a pair of the first cam teeth (152);
a first indexing ring (80) slidably received on the indexing guide (78) for reciprocating motion along the actuation axis (102), the first indexing ring (80) defining a plurality of first spline teeth (184), a first abutment surface (170) and a second cam (C2), the first spline teeth (184) being disposed on an internal surface of the first indexing ring (80) and received in the guide grooves (150), the second cam (C2) being spaced apart from the first abutment surface (170) along the actuation axis (102) and having a plurality of second cam teeth (174);
a second indexing ring (82) slidably received on the indexing guide (78) for reciprocating motion along the actuation axis (102), the second indexing ring (82) defining a plurality of second spline teeth (184') and a third cam (C2'), the second spline teeth being disposed on an interior surface of the second indexing ring (82) and engaging the first cam (C1), the third cam (C2') being engaged to the second cam (C2);
an actuator output (76, 76');
a first spring (88) on a side of the actuator output (76, 76') opposite the second indexing ring (82), the first spring (88) biasing the actuator output (76, 76') toward the second indexing ring (82);
a motor (90) having a motor output member (212) that is configured to move the first indexing ring (80) along the actuation axis (102) from a first position to a second position, wherein the second spline teeth (184') are not engaged to the first cam teeth (152) when the first indexing ring (80) is in the first position, and wherein the second spline teeth (184') are disposed on the first cam teeth (152) when the first indexing ring (80) is in the second position.

2. The actuator (64) of claim 1, further comprising a second spring (84) disposed between the actuator output (76, 76') and the second indexing ring (82), the second spring (84) biasing the second indexing ring (82) away from the actuator output (76, 76') and toward the first indexing ring (80).

3. The actuator (64) of claim 2, wherein the second indexing ring (82) defines a second abutment surface (170') that is spaced apart from the third cam (C2') along the actuation axis (102), the second abutment surface (170') being configured to receive force exerted from the second spring (84).

4. The actuator (64) of claim 3, wherein the second abutment surface (170') is formed on an axial end of the second indexing ring (82).

5. The actuator (64) of claim 1, wherein the motor (90) is a linear motor.

6. The actuator (64) of claim 5, wherein the linear motor comprises an armature (212) and an electromagnet (210) that is configured to move the armature (212).

7. The actuator (64) of claim 6, wherein the armature (212) abuts the first abutment surface (170).

8. The actuator (64) of claim 1, wherein the actuator output (76) defines a plurality of teeth (120, 122).

9. The actuator (64) of claim 1, wherein the actuator output (76') comprises a fork (300).

10. The actuator (64) of claim 9, wherein the fork (300) is mounted to a splined sleeve (302) such that translation of the fork (300) causes corresponding translation of the splined sleeve (302).

11. An actuator (64) comprising:
an annular indexing guide (78) that is disposed along an actuation axis (102), the indexing guide (78) defining a first cam (C1) having a plurality of first cam teeth (152) and a plurality of guide grooves (150), the first cam teeth (152) being spaced circumferentially about the indexing guide (78), the guide grooves (150) being spaced circumferentially about the indexing guide (78) such that each of the guide grooves (150) is disposed between a pair of the first cam teeth (152);
a first indexing ring (80) slidably received on the indexing guide (78) for reciprocating motion along the actuation axis (102), the first indexing ring (80) defining a plurality of first spline teeth (184), a first abutment surface (170) and a second cam (C2), the first spline teeth (184) being disposed on an internal surface of the first indexing ring (80) and received in the guide grooves (150), the second cam (C2) being spaced apart from the first abutment surface (170) along the actuation axis (102) and having a plurality of second cam teeth (174);
a second indexing ring (82) rotatably and slidably received on the indexing guide (78), the second indexing ring (82) defining a plurality of second spline teeth (184') and a third cam (C2'), the second spline teeth (184') being disposed on an interior surface of the second indexing ring (82) and engaging the first cam (C1), the third cam (C2') being engaged to the second cam (C2);
an actuator output (76, 76');
a first spring (84) between the actuator output (76, 76') and the second indexing ring (82) the first spring (84) biasing the second indexing ring (82) away from the actuator output (76, 76') and toward the first indexing ring (80);
a second spring (88) on a side of the actuator output (76, 76') opposite the first spring (84), the second spring (88) biasing the actuator output (76, 76') toward the second indexing ring (82);
a motor (90) having a motor output member (212) that is configured to move the first indexing ring (80) along the actuation axis (102) from a first position to a second position, wherein engagement of the second and third cam teeth (174, 174') as the first indexing ring (80) is repeatedly reciprocated between the first and second positions causes rotation of the second indexing ring (82) about the actuator axis (102) such that the second spline teeth (184') can be alternately aligned to the first cam teeth (152) and the guide grooves (150).

12. The actuator (64) of claim 11, wherein each of the first cam teeth (152) defines a first ramp (160), a valley (162), an abutment wall (164) and a second ramp (166), wherein force exerted onto the second indexing ring (82) by the first spring (84) when the actuator output (76, 76') is in the first position and the second spline teeth (184') are received onto the first ramps (160) causes rotation of the second indexing ring (82) about the actuation axis (102) so that the second spline teeth (184') are received in the valleys (162) and abutted against the abutment walls (164), and wherein force exerted onto the second indexing ring (82) by the first spring (84) when the actuator output (76, 76') is in the first position and the second spline teeth (184') are received onto the second ramps (166) causes rotation of the second indexing ring (82) about the first actuation axis (102) so that the second spline teeth (184') are received into the guide grooves (150).

13. The actuator (64) of claim 11, wherein the second indexing ring (82) defines a second abutment surface (170') that is spaced apart from the third cam (C2') along the actuation axis (102), the second abutment surface (170') being configured to receive force exerted from the first spring (84).

14. The actuator (64) of claim 13, wherein the second abutment surface (170') is formed on an axial end of the second indexing ring (82).

15. The actuator (64) of claim 11, wherein the motor (90) is a linear motor.

16. The actuator (64) of claim 15, wherein the linear motor comprises an armature (212) and an electromagnet (210) that is configured to move the armature (212).

17. The actuator (64) of claim 16, wherein the armature (212) abuts the first abutment surface (170).

18. The actuator (64) of claim 11, wherein the actuator output (76) defines a plurality of teeth (120, 122).

19. The actuator (64) of claim 11, wherein the actuator output (76') comprises a fork (300).

20. The actuator (64) of claim 9, wherein the fork (300) is mounted to a splined sleeve (302) such that translation of the fork (300) causes corresponding translation of the splined sleeve (302).

\* \* \* \* \*